US012743073B2

(12) United States Patent
Koehler et al.

(10) Patent No.: US 12,743,073 B2
(45) Date of Patent: Sep. 22, 2026

(54) SYSTEMS AND METHODS FOR AUTOMATICALLY ENSURING THE STABILITY AND CONTROLLABILITY OF A NONLINEAR CONTROL SYSTEM

(71) Applicant: Toyota Jidosha Kabushiki Kaisha, Toyota (JP)

(72) Inventors: Sarah M. Koehler, San Jose, CA (US); Matthew J. Brown, Palo Alto, CA (US); Francis E. Fearon, San Fransico, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 433 days.

(21) Appl. No.: 18/476,782

(22) Filed: Sep. 28, 2023

(65) Prior Publication Data

US 2025/0110475 A1 Apr. 3, 2025

(51) Int. Cl.
*G05B 19/4155* (2006.01)

(52) U.S. Cl.
CPC .................... *G05B 19/4155* (2013.01); *G05B 2219/42007* (2013.01)

(58) Field of Classification Search
CPC .................. G05B 19/4155; G05B 2219/42007
See application file for complete search history.

(56) References Cited

U.S. PATENT DOCUMENTS

| | | | |
|---|---|---|---|
| 9,377,998 | B2 | 6/2016 | Han et al. |
| 9,619,212 | B2 | 4/2017 | Fige et al. |
| 10,915,075 | B2 | 2/2021 | Jiang et al. |

(Continued)

FOREIGN PATENT DOCUMENTS

| | | | |
|---|---|---|---|
| CN | 111258323 | A | 6/2020 |

OTHER PUBLICATIONS

Paper “Automatic Code Generation for Real-Time Convex Optimization”, by Jacob Mattingley , published in 2009, <online>, retrieved from <https://web.stanford.edu/~boyd/papers/pdf/rt_cvx_opt.pdf> (Year: 2009).*

(Continued)

*Primary Examiner* — Charles Cai
(74) *Attorney, Agent, or Firm* — Christopher G. Darrow; Darrow Mustafa PC

(57) ABSTRACT

Systems and methods for automatically ensuring the stability and controllability of a nonlinear control system are disclosed herein. In one embodiment, a system receives, at a nonlinear model predictive controller, optimal control problem code representing an optimal control problem that includes a continuous time model representing a nonlinear dynamical system. The system discretizes automatically the continuous time model to produce a discrete time model that includes one or more parameters. The system also checks automatically the one or more parameters to identify one or more regions in a parameter space in which the discrete time model is both stable and controllable when used by the nonlinear model predictive controller. The system also controls, at least in part, operation of the nonlinear dynamical system using the nonlinear model predictive controller configured with values of the one or more parameters that lie within the one or more stable and controllable regions.

20 Claims, 9 Drawing Sheets

(56) References Cited

U.S. PATENT DOCUMENTS

| | | | |
|---|---|---|---|
| 11,080,103 B1 | 8/2021 | Kher et al. | |
| 11,354,463 B1 | 6/2022 | Babaali et al. | |
| 2009/0012756 A1 | 1/2009 | Glass | |
| 2012/0010732 A1 | 1/2012 | Stewart et al. | |
| 2018/0046192 A1 | 2/2018 | Keller et al. | |
| 2018/0081681 A1 | 3/2018 | Sethu | |
| 2018/0137083 A1 | 5/2018 | Aramon et al. | |
| 2019/0026404 A1 | 1/2019 | Gumussoy et al. | |
| 2019/0375441 A1 | 12/2019 | Green et al. | |
| 2020/0132775 A1 | 4/2020 | Kanai et al. | |
| 2020/0293009 A1 | 9/2020 | Quirynen et al. | |
| 2020/0377087 A1 | 12/2020 | Chen et al. | |
| 2021/0165409 A1 | 6/2021 | Berntorp et al. | |
| 2021/0373513 A1 | 12/2021 | Quirynen et al. | |
| 2021/0403056 A1 | 12/2021 | McGill et al. | |
| 2022/0017103 A1* | 1/2022 | Koehler | G06F 17/16 |
| 2024/0404244 A1* | 12/2024 | Deschaintre | G06V 10/54 |

OTHER PUBLICATIONS

Vukov et al. "Auto-generated algorithms for nonlinear model predictive control on long and on short horizons." 52nd IEEE Conference on Decision and Control. IEEE, 2013. Available at https://acrobat.adobe.com/link/review?uri=urn:aaid:scds:US:c8478121-7378-3e60-878d-4e51af6bd56a.

Dai et al. "Control Parameter Optimization for Autonomous Vehicle Software Using Virtual Prototyping." 2017 IEEE International Symposium on Software Reliability Engineering Workshops (ISSREW). IEEE, 2017. Available at https://ieeexplore.ieee.org/stamp/stamp.jsp?tp=&arnumber=8109255.

Je Mattingley, "Code Generation for Embedded Convex Optimization," Stanford University, 2011. Available at https://acrobat.adobe.com/link/review?uri=urn:aaid:scds:US:a603f38e-08e7-3a72-a9a9-ee6887da3d0d.

Satzger et al. "Predictive Brake Control for Electric Vehicles," IEEE Transactions on vehicular technology 67.2 (2017): 977-990. Available at https://acrobat.adobe.com/link/review?uri=urn:aaid:scds:US:204f1c74-d89a-3734-9b37-5e70fc1cfa76.

Grune et al. "Ensuring Stability in Networked Systems with Nonlinear MPC for Continuous Time Systems," 2012 IEEE 51st IEEE Conference on Decision and Control (CDC). IEEE, 2012. Available at https://acrobat.adobe.com/link/review?uri=urn:aaid:scds:US:7667107b-384f-3289-b5c5-9bbccdbcfb6e.

Mattingley et al. Automatic code generation for real-time convex optimization. (2010): 1-41. Available at https://acrobat.adobe.com/link/review?uri=urn:aaid:scds: US:f7d6ed70-4d9e-3187-a63b-260c96aa90f5.

* cited by examiner

200

202

```
// Create a linearized / discretized system.
auto system = Builder()
// Indicate the state variables of the dynamic system are called v, a.
.state({v, a})
// Indicate the control input to the dynamic system   is J.
.input(J)
// Indicate parameters of the dynamic system are beta_1, beta_2.
.parameter({beta_1, beta_2})
// Encode the differential equations describing the dynamics
// $\dot{v}$ and $\dot{a}$, equations (1a), (1b).
.dynamics({a_cmd - beta_1 - beta_2 * pow(v, 2), J})
// Linearize the dynamics with the linearization point of v set to v_LP.
.LinearizeDynamics(v, v_LP)
// Discretize the dynamics using forward euler method with the specified
time_step. .DiscretizeDynamicsForwardEuler(time_step)
.Build<Expression>();
```

203 (206, 208)

```
system.CheckStabilityAndControllability(parameter_value_ranges);
is_parameter_combination_good_array
for (a_value, b_value, ...) in (parameter_value_ranges.a,
parameter_value_ranges.b, ...):
is_parameter_combination_good_array(a_value, b_value, ...) =
CheckStabilityAndControllability(system, a_value, b_value, ...)
return is_parameter_combination_good_array
LookUpIfParameterCombinationIsGood(is_parameter_combination_good_array,
a_value, b_value, ...);
```

204

```
// Add stage costs, equations (2).
// Create a time varying parameter called ref_velocity.
ref_v_ = prog.NewSequentialParameter("ref_velocity");
// Create a time varying parameter called ref_acceleration.
ref_a_ = prog.NewSequentialParameter("ref_acceleration");
// Add to the cost function $\sum_{k=0}^{N} [\psi_v (v(k) - v_{des})^2$.
prog.AddRunningCost(problem_parameters.cost.velocity * pow(v - ref_v_, 2));
// Add to the cost function $\sum_{k=0}^{N} [\psi_a (v(k) - a_{des})^2$.
prog.AddRunningCost(problem_parameters.cost.accel * pow(vdot_linearized - ref_a_, 2));
// Add to the cost function $\sum_{k=0}^{N} [\psi_j J(k)^2$.
prog.AddRunningCost(problem_parameters.cost.jerk * pow(J, 2));
```

```
// Add hard stage-constraints

// Equation (3a).
// Create a time varying parameter called v_min.
v_min_ = prog.NewSequentialParameter("v_min");
// Create a time varying parameter called v_max.
v_max_ = prog.NewSequentialParameter("v_max");
// Add the contraint that v must be greater than or equal to v_min for all steps k.
prog.AddConstraintToAllKnotPoints(v_min_ <= v);
// Add the contraint that v must be less than or equal to v_max for all steps k.
prog.AddConstraintToAllKnotPoints(v <= v_max_);

// Equation (3b).
// Add the contraint that a must be greater than or equal to a_min for all steps k. Note
prog.AddConstraintToAllKnotPoints(problem_parameters.constraint.a_min <= a);
// Add the contraint that a must be less than or equal to a_max for all steps k.
prog.AddConstraintToAllKnotPoints(a <= problem_parameters.constraint.a_max);

// Similar for J, equation (3c).
prog.AddConstraintToAllKnotPoints(problem_parameters.constraint.J_min <= J);
prog.AddConstraintToAllKnotPoints(J <= problem_parameters.constraint.J_max);
```

```
/* Auto generated solver customizations*/
struct Config {
    using NumericType = double;
    enum : bool {
    kDiagonalMatrices = true,
    kTimeInvariant = true,
    kDynamicMemoryAllocation = false,
}
  enum : int {
    kNumStates = 3,
    kNumInputs = 5,
  }
}
```

224

```
/* Auto generated solver inputs */
Matrix A(Parameters p) {

}
Matrix B(Parameters p) {

}

DoSolve(Parameters p) {
  y = Conex::Solve<Config>( A(p), B(p), ... );
}
```

```
Matrix MakeInput(Parameters p) {
  A[0][0] = (0.02 + (2 * (1 + (-4 * (1 * p[1] * p[2] * p[3])) +
          (4 * (1 * pow(p[1], 2.000000) * pow(p[2], 2.000000) *
            pow(p[3], 2.000000))))));
  A[0][1] = (0 + (2 * p[3]) + (-4 * (1 * p[1] * p[2] * pow(p[3], 2.000000))));
  A[1][0] = (0 + (2 * p[3]) + (-4 * (1 * p[1] * p[2] * pow(p[3], 2.000000))));
  A[1][1] = (2 * pow(p[3], 2.000000));
return A;
}
```

FIG. 6

SYSTEMS AND METHODS FOR AUTOMATICALLY ENSURING THE STABILITY AND CONTROLLABILITY OF A NONLINEAR CONTROL SYSTEM

TECHNICAL FIELD

The subject matter described herein relates in general to nonlinear control systems and, more particularly, to systems and methods for automatically ensuring the stability and controllability of a nonlinear control system that includes a nonlinear model predictive controller.

BACKGROUND

A nonlinear model predictive controller may be utilized to control a nonlinear system such as an autonomous vehicle according to a desired reference. A nonlinear model predictive controller predicts future outcomes over a receding horizon and attempts to minimize the cost between predicted and desired outcomes using a cost function.

Nonlinear model predictive controllers receive as input executable solver code that represents an optimization problem that is derived from a higher-level optimal control problem for controlling a controlled system within defined constraints. One challenge that arises is that discretizing a continuous time model of a nonlinear dynamical system to produce a discrete time model of the nonlinear dynamical system can result in parameters being input to the solver that render the discrete time model unstable and/or uncontrollable.

SUMMARY

An example of a nonlinear control system is presented herein. The system comprises a processor and a memory storing machine-readable instructions that, when executed by the processor, cause the processor to receive, at a nonlinear model predictive controller, optimal control problem code representing an optimal control problem that includes a cost function, one or more constraints, and a continuous time model representing a nonlinear dynamical system. The memory also stores machine-readable instructions that, when executed by the processor, cause the processor to discretize automatically the continuous time model to produce a discrete time model of the nonlinear dynamical system. The discrete time model includes one or more parameters. The memory also stores machine-readable instructions that, when executed by the processor, cause the processor to check automatically the one or more parameters by sweeping at least one of the one or more parameters through a predetermined operational range to identify one or more regions in a parameter space in which the discrete time model is both stable and controllable when used by the nonlinear model predictive controller. The memory also stores machine-readable instructions that, when executed by the processor, cause the processor to control, at least in part, operation of the nonlinear dynamical system using the nonlinear model predictive controller. In controlling the nonlinear dynamical system, the nonlinear model predictive controller is configured with values of the one or more parameters that lie within the one or more stable and controllable regions of the parameter space.

Another embodiment is a non-transitory computer-readable medium for automatically ensuring the stability and controllability of a nonlinear control system and storing instructions that, when executed by a processor, cause the processor to receive, at a nonlinear model predictive controller, optimal control problem code representing an optimal control problem that includes a cost function, one or more constraints, and a continuous time model representing a nonlinear dynamical system. The instructions also cause the processor to discretize automatically the continuous time model to produce a discrete time model of the nonlinear dynamical system. The discrete time model includes one or more parameters. The instructions also cause the processor to check automatically the one or more parameters by sweeping at least one of the one or more parameters through a predetermined operational range to identify one or more regions in a parameter space in which the discrete time model is both stable and controllable when used by the nonlinear model predictive controller. The instructions also cause the processor to control, at least in part, operation of the nonlinear dynamical system using the nonlinear model predictive controller. In controlling the nonlinear dynamical system, the nonlinear model predictive controller is configured with values of the one or more parameters that lie within the one or more stable and controllable regions of the parameter space.

In another embodiment, a method of automatically ensuring the stability and controllability of a nonlinear control system is disclosed. The method comprises receiving, at a nonlinear model predictive controller, optimal control problem code representing an optimal control problem that includes a cost function, one or more constraints, and a continuous time model representing a nonlinear dynamical system. The method also includes discretizing automatically the continuous time model to produce a discrete time model of the nonlinear dynamical system. The discrete time model includes one or more parameters. The method also includes checking automatically the one or more parameters by sweeping at least one of the one or more parameters through a predetermined operational range to identify one or more regions in a parameter space in which the discrete time model is both stable and controllable when used by the nonlinear model predictive controller. The method also includes controlling, at least in part, operation of the nonlinear dynamical system using the nonlinear model predictive controller. In controlling the nonlinear dynamical system, the nonlinear model predictive controller is configured with values of the one or more parameters that lie within the one or more stable and controllable regions of the parameter space.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It is to be noted, however, that the appended drawings illustrate only possible implementations of this disclosure and are therefore not to be considered limiting of its scope. The disclosure may admit to other implementations.

FIGS. 4A and 4B illustrate illustrative optimal control problem code according to one or more embodiments described and illustrated herein.

FIG. 5 illustrates an example solver template that is populated automatically by solver code generation according to one or more embodiments described and illustrated herein.

FIG. 6 illustrates an example automatically generated matrix code according to one or more embodiments described and illustrated herein.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
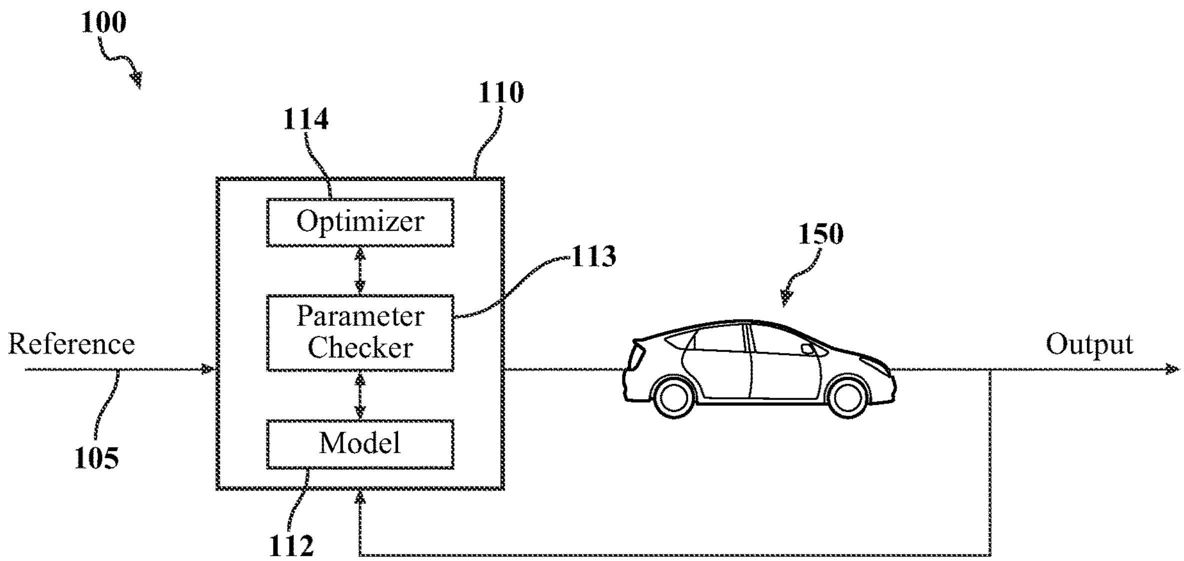
FIG. 1 schematically depicts an example system for controlling a controlled system using a nonlinear model predictive controller according to one or more embodiments disclosed and illustrated herein.

The embodiments disclosed herein describe systems and methods for automatically generating solver code for nonlinear model predictive controllers. More particularly, embodiments provide a programming language that users can use to write simple code expressing the optimal control problem for a nonlinear model predictive controller rather than requiring manual writing of complicated and lengthy solver code that is readable by the nonlinear model predictive controller. In other words, the user writes code that follows the mathematical expression of the optimal control problem rather than the canonical form of the optimization problem.

Embodiments extract the optimal control problem from simple optimal control problem code written by the user and encode it into a canonical form of a linear optimization problem using a user-specified linearization point, a user-specified discretization method, and a user-specified parameter specification. From the optimization problem, a solver code generator creates the solver code by populating a solver template. Thus, the user is not required to generate the thousands of lines of solver code that is executable by the model predictive control solver.

Additionally, embodiments automatically ensure the stability and controllability of a nonlinear control system for which solver code is generated. More specifically, during an offline phase, the embodiments automatically check the validity of one or more parameters of a discrete time model of a nonlinear dynamical system used by a nonlinear model predictive controller by sweeping at least one of the one or more parameters through a predetermined operational range to identify one or more regions in the parameter space in which the discrete time model is both stable and controllable, when used by the nonlinear model predictive controller.

From this analysis of the parameters, parameter-checking code can be generated that, in real time during an online phase, checks to ensure that parameters input to the nonlinear model predictive controller lie within one of the stable and controllable regions of the parameter space identified during the offline phase. This enables a nonlinear control system employing the generated solver code to control, at least in part, the operation of a nonlinear dynamical system using the nonlinear model predictive controller, the nonlinear model predictive controller being configured with values of the one or more parameters that lie within the one or more stable and controllable regions of the parameter space. Herein, "stability" refers to the open-loop stability of the discrete time model, and "controllability" is a term of art used in control theory to refer to the ability of a control system to reach a definite state from an initial state in finite time.

Herein, a "nonlinear dynamical system" refers to a wide variety of systems. For example, in some embodiments, the nonlinear dynamical system is a robot. One example of a robot discussed frequently below for illustrative purposes is an autonomous vehicle. However, the principles of the embodiments described herein are also applicable to many other types of robots, including, without limitation, service robots, delivery robots, companionship robots, and unmanned aerial vehicles (UAVs), also commonly referred to as "aerial drones."

Various embodiments of systems and methods for automatically generating solver code for a nonlinear model predictive control solver are described in detail below.

Referring now to FIG. 1, a non-limiting example of a nonlinear control system 100 (hereinafter simply "system 100") comprising a non-linear model predictive controller 110 and a controlled nonlinear dynamical system 150 (hereinafter, sometimes simply "controlled system 150") is schematically illustrated. It should be noted that, in some embodiments, system 100 can include additional elements that are not shown in FIG. 1. The controlled system 150 is illustrated as a vehicle (e.g., an autonomous vehicle); however, it should be understood, as discussed above, that embodiments are not limited to vehicles and that the controlled system 150 may be any nonlinear dynamical system. In embodiments, the nonlinear model predictive controller 110 is nonlinear in the sense that it uses a nonlinear system model 112 in the control prediction. In embodiments described herein, the nonlinear model predictive control solver used by the nonlinear model predictive controller 110 may be a convex quadratic programming solver, a sequential quadratic programming solver, or any other known or yet-to-be-developed solver capable of solving nonlinear problems presented by nonlinear model predictive control.

Figure 2:
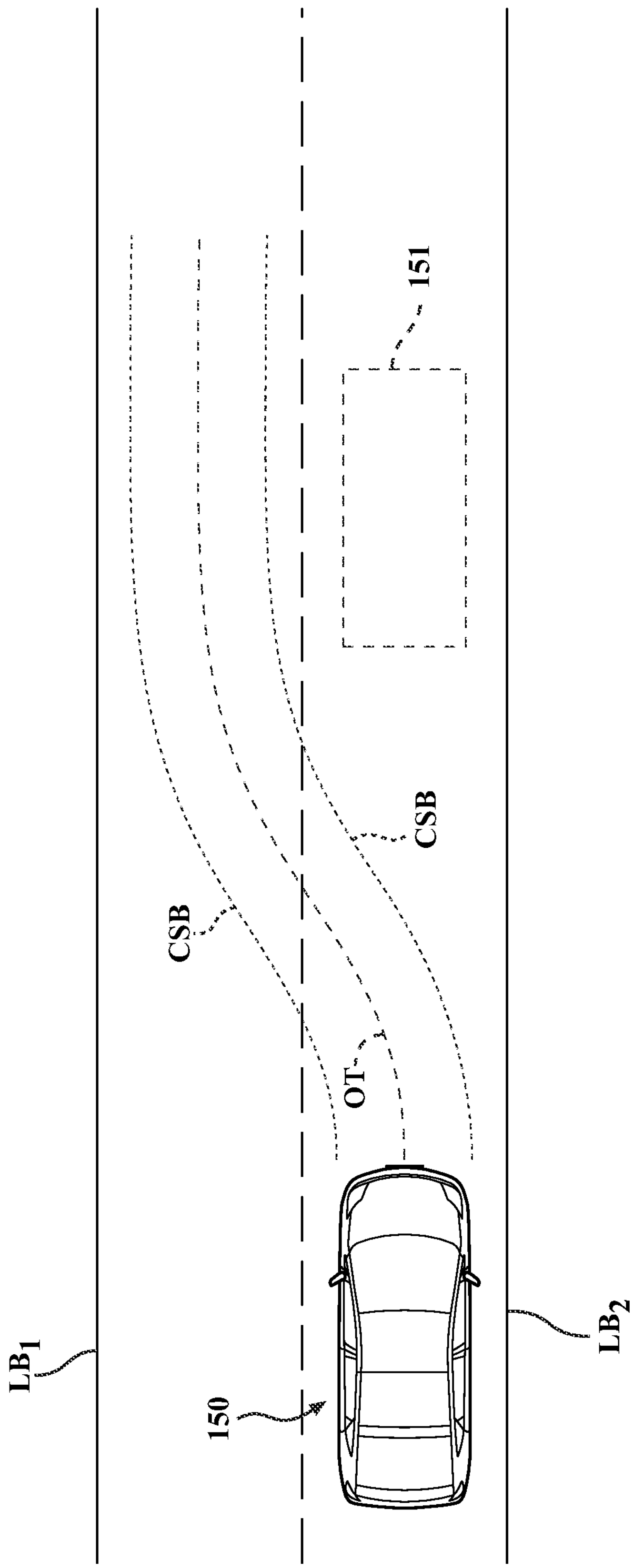
FIG. 2 schematically depicts an example autonomous vehicle navigating a road to avoid an obstacle according to an optimum trajectory according to one or more embodiments described and illustrated herein.

The nonlinear model predictive controller 110 receives a reference input that represents a desired state of the controlled system 150. FIG. 2 illustrates an example vehicle scenario in which an autonomous vehicle 150 is to take an optimum trajectory OT to avoid an obstacle 151 in the roadway. Obstacle 151 might be, for example, another vehicle driving slowly. The goal of the nonlinear model predictive controller 110 is to maintain the autonomous vehicle 150 as close as possible to the optimum trajectory OT. The optimum trajectory OT is positioned within the convex spatial boundary (CSB) defining potential solutions. This spatial boundary also includes non-optimum solutions (i.e., non-optimum trajectories).

The nonlinear model predictive controller 110 utilizes an optimizer 114 that includes a cost function used to calculate the difference (i.e., the cost) between the position of the controlled vehicle 150 with respect to the optimum trajectory OT (or, more generically, a "reference function"). Embodiments are not limited by any particular cost function. As a non-limiting example, the cost function may be to minimize deviation from a desired velocity or a desired acceleration. In addition, there may be some constraints on the possible behavior of the controlled vehicle 150. For example, in a vehicle application, constraints may be to stay within the lane boundaries (e.g., lane boundaries $LB_1$, $LB_2$ shown in FIG. 2), to drive below an upper speed limit, to drive above a lower speed limit, to accelerate below an acceleration limit, not to jerk quickly to the left and right (i.e., a jerk limit), to stay a minimum distance from other vehicles, and the like.

The problem for the nonlinear model predictive controller 110 to solve may be expressed as an optimal control problem. The dynamics of controlled vehicle may be modeled by a parameterized continuous time model (e.g., model 112 of FIG. 1) that will be automatically discretized and linearized, as described in more detail below:

$$\text{Dynamics: } \dot{v} = a_{cmd} - \beta_1 - \beta_2 v^2 \qquad \text{Eq. (1a)}$$

$$\dot{a}_{cmd} = J \qquad \text{Eq. (1b)}$$

where v, a are the states, J is the control input, $\beta_1$ and $\beta_2$ are parameters.

A non-limiting example cost function for minimizing deviation from a desired velocity and acceleration is provided below:

$$\text{Cost function:}$$

$$\min_{[v(k),a(k),J(k)\forall k]in[0,N]} \sum_{k=0}^{N_v}\left[\psi_v(v(k)-v_{des}(k))^2+\psi_a(a(k)-a_{des}(k))^2+\psi_j J(k)^2\right] \qquad \text{Eq. (2)}$$

where $v_{des}$ is the time-varying desired reference for v, and $a_{des}$ is the time-varying reference for a.

The constraints in this example are to obey speed, acceleration, and jerk safety/comfort limits:

$$\text{Contraints: } v_{min}(k) \le v \le v_{max}(k) \qquad \text{Eq. (3a)}$$

$$a_{min} \le a_{cmd} \le a_{max} \qquad \text{Eq. (3b)}$$

$$J_{min} \le J \le J_{max} \qquad \text{Eq. (3c)}$$

where $v_{min}$, $v_{max}$ are the parameters describing the time-varying lower and upper bounds for v, respectively, and similarly for a and J. It should be understood that any cost function, models, and constraints may be utilized by the systems and methods described herein.

Nonlinear problem solvers, such as a nonlinear model predictive control solver, require the optimal control problem to be transformed into an optimization problem in canonical form. Since the optimal control problems described herein are nonlinear, an encoding step is performed to discretize and linearize the optimal control problem. Using another vehicle system example, the vehicle dynamics may be expressed as:

$$\dot{x} = f(x, u) \qquad \text{Eq. (4)}$$

The cost function may be, for example, deviation from an optimum trajectory (e.g., the optimum trajectory of FIG. 2), and the constraints may be obstacle positions, actuator limits (e.g., brake pedal, steering wheel, accelerator pedal), and the like. As described in more detail below, the systems and methods of the present disclosure enable a user to select a desired discretization method, a preferred linearization point, and a parameter specification for the encoding step.

The parameter specification allows a user to specify where and what time-varying and/or time-invariant parameters are to be populated in the equations.

The result of the encoding step is an optimization problem. An optimization problem written in canonical form for the above example is as follows:

$$\min\sum_{k=0}^{N}\begin{bmatrix}x_k\\u_k\end{bmatrix}^T H_k\begin{bmatrix}x_k\\u_k\end{bmatrix}+h_k\begin{bmatrix}x_k\\u_k\end{bmatrix} \qquad \text{Eq. (5)}$$

$$\text{s.t. } x_{k+1} = A_k x_k + B_k u_k + d_k$$

$$F_k x_k + G_k + c_k \le 0$$

The optimization problem resulting from the encoding process is imported into solver code that is executable by a processor using a solver program. Non-limiting example solver programs include, but are not limited to, Forces Pro, OSQP, and Interior Point OPTimizer (IPOPT). The solver code, which is a component of the nonlinear model predictive controller 110 shown in FIG. 1, produces outputs that are provided to the controlled system, such as an autonomous vehicle 150. For example, the output of the nonlinear model predictive controller 110 is provided to actuators of the autonomous vehicle 150 such that the autonomous vehicle 150 drives as closely to the optimum trajectory OT as possible. Data provided by vehicle sensors (not shown in FIG. 1) such as a speedometer, steering angle sensors, location sensors, camera sensors, and the like are fed back to the nonlinear model predictive controller 110 to calculate the optimal cost with respect to the reference 105.

Importing the optimization problem into solver code has historically been a manual process performed by software engineers. Solver code representing a complex optimization problem, such as those resulting from a nonlinear optimal control problem for controlling an autonomous vehicle, may have thousands of lines of code. Thus, it is a very time-consuming and expensive process to write solver code manually. Additionally, minor changes in existing solver code may be time consuming and introduce unforeseen errors into the solver code.

Embodiments of the present disclosure simplify the writing of solver code by automating it such that the software engineer writes many fewer lines of code than previously. Particularly, embodiments of the present disclosure provide a programming language that is intuitive and enables a software engineer to write solver code simply by expressing the optimal control program rather than the optimization problem. Embodiments automate both the encoding process as well as the writing of the solver code itself.

Referring again to FIG. 1, in embodiments, nonlinear model predictive controller 110 includes a parameter checker 113. As discussed above, system 100 receives, at nonlinear model predictive controller 110, optimal control problem code representing an optimal control problem that includes a cost function, one or more constraints, and a continuous time model 112 representing a nonlinear dynamical system 150. System 100 automatically discretizes the continuous time model 112 to produce a discrete time model (not shown in FIG. 1) of the nonlinear dynamical system 150. In some embodiments, system 100 also automatically linearizes the continuous time model 112 in accordance with a specified linearization point, as explained in greater detail elsewhere herein.

The resulting discrete time model includes one or more parameters. During an online phase of system 100 in which system 100 controls a nonlinear dynamical system 150, parameter checker 113 automatically checks the validity of one or more parameters input to the nonlinear model predictive controller 110 by ensuring that the parameters lie within a region of the parameter space in which the discrete time model is both stable and controllable, when used by the nonlinear model predictive controller 110. In some embodiments, system 100 (or another system such as system 400 discussed below in connection with FIG. 7), during a prior offline phase, analyzes the parameter space of the discrete time model to identify one or more regions of the parameter space in which the discrete time model is both stable and controllable. In some embodiments, the system does so by sweeping at least one of the one or more parameters through a predetermined operational range and analyzing the stability and controllability of the discrete time model. An example illustrating a stability and controllability analysis of two parameters of a discrete time model and identifying a region in the parameter space in which the associated discrete time model is both stable and controllable, when used by the nonlinear model predictive controller 110, is discussed below in connection with FIG. 4C.

In some embodiments, a system like system 100 or system 400 (refer to the discussion of FIG. 7 below) generates executable program code for parameter checker 113 that automatically checks, for stability and controllability, one or more parameters input to the nonlinear model predictive controller 110 during "online" control of the controlled system 150, as discussed above.

To analyze stability for a given set of model parameters, parameter checker 113, in one embodiment, computes the eigenvalues of a linearized discrete time system (derived from continuous time model 112). If the eigenvalues have a magnitude less than 1, the system is said to be stable. (Note that if the eigenvalues of the continuous time system are less than 0, the continuous time system is said to be stable.) The stability of the discrete time system can be compared to the stability of the continuous time system to determine whether stability has been lost due to discretization. In other words, parameter checker 113 analyzes the stability of the discrete time system relative to that of the continuous time system represented by model 112. This helps to avoid the problem of the continuous time system being stable but the discrete time system being unstable.

To analyze controllability for a given set of model parameters, parameter checker 113 computes the Controllability Gramian of the discrete time model. Parameter checker 113 determines whether the Controllability Gramian is full rank. If so, the system is said to be controllable. Similar mathematical techniques can be used to analyze stability and controllability during the offline phase.

Figure 3:
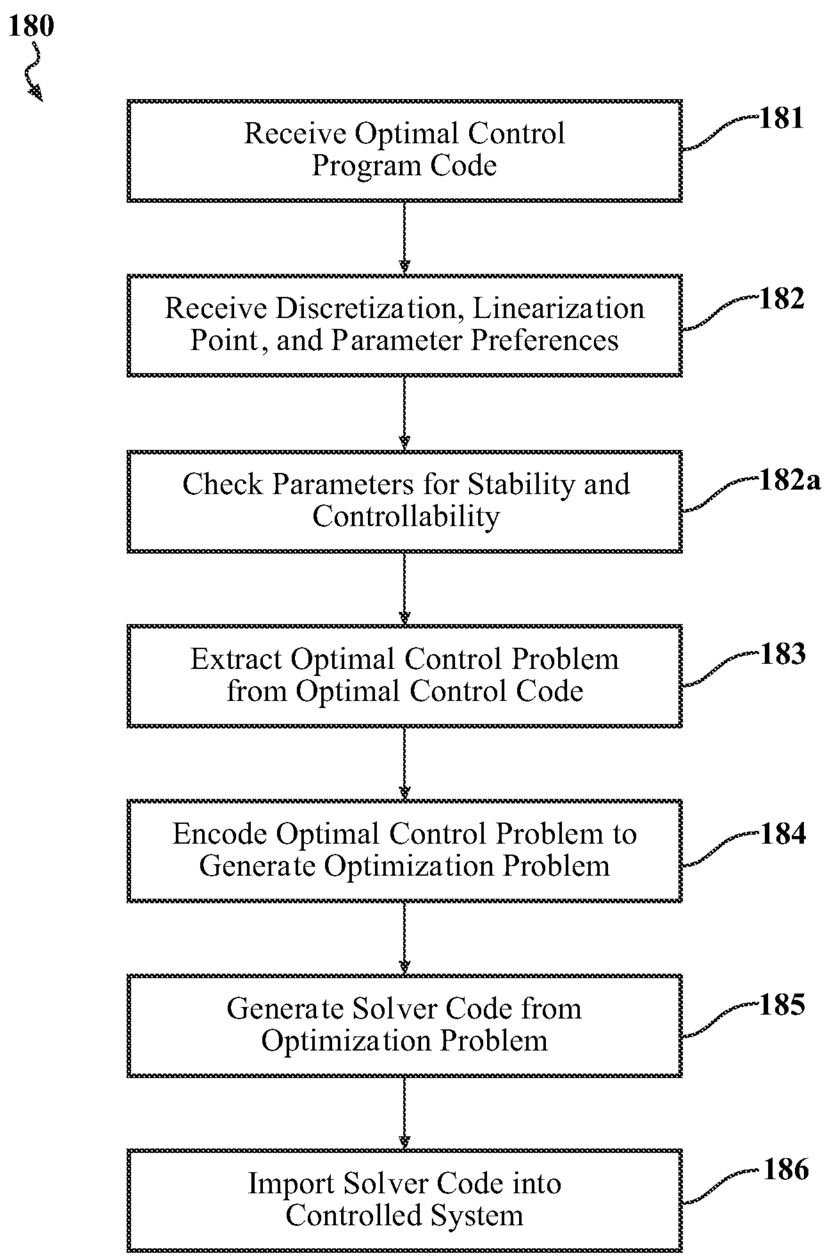
FIG. 3 illustrates an example method for automatically generating solver code for a nonlinear model predictive control solver according to one or more embodiments described and illustrated herein.

Referring now to FIG. 3, an example method 180 for automatically generating solver code for a nonlinear model predictive control solver is illustrated. At block 181, a system (e.g., system 100 in FIG. 1 or system 400 in FIG. 7) receives optimal control program code from a user. Referring to FIGS. 4A-4B, sample optimal control problem code 200 corresponding to the optimal control problem defined by Equations (1a)-(3c) above is illustrated. The syntax of the programming language is such that the user need only write code that follows the optimal control program. As shown in FIGS. 4A-4B, the optimal control problem code 200 includes a system dynamics sub-component 202 that describes the dynamics of Equations (1a) and (1b) and creates a linearized and discretized system. The user may easily import the state, input, parameters, and the dynamics of the controlled system. The optimal control problem code 200 may be entered into a computing device, such as a general-purpose computer, for example. It is noted that each line of the example optimal control problem code 200 is annotated with a comment (preceded by "//") that describes its purpose and function.

As stated above, the embodiments of the present disclosure enable the user to provide a parameter specification within the optimal control problem code. The parameter specification allows a user to specify where and what time-varying and time-invariant parameters are to be included in the equations. In the example of FIGS. 4A and 4B, beta_1 and beta_2 in the system dynamics sub-component 202 are specified by the user to be time-invariant parameters. In another example, ref_v_is a time-varying parameter in cost sub-component of the optimal control problem code 200 example. Thus, the user symbolically indicates time-varying or time-invariant parameters in the optimal control problem code 200.

The embodiments of the present disclosure also enable a user to customize the linearization point and the desired discretization method to create the linearized and discretized system. At block 182 of FIG. 3, a preferred discretization method and linearization point is received. In some embodiments, the discretization method and linearization points are provided in the optimal control program code of block 181. In other embodiments, they are selectable features in a user interface, for example.

In the example of FIGS. 4A-4B, the user has set the linearization point to variable v_LP and can readily change the value of the variable to evaluate different linearization points. Embodiments enable the selection of a desired discretization method from a plurality of discretization methods. In the illustrated example, the user has selected the Euler discretization method with a specified time step. Other discretization methods include, but are not limited to, zero-order hold, trapezoidal, Runge-Kutta, and others. The ability for the user to customize the linearization point and the discretization method allows the user to easily experiment and test different configurations without having to write or rewrite thousands of lines of code.

At block 182*a* of FIG. 3, a system such as system 100 or system 400 (see the discussion of FIG. 7 below) automatically checks the parameters of the discrete time model for stability and controllability. As discussed above, in some embodiments, the system, during an offline phase, analyzes the parameter space of the discrete time model to identify one or more regions of the parameter space in which the discrete time model is both stable and controllable. In some embodiments, the system does so by sweeping at least one of the one or more parameters through a predetermined operational range and analyzing the resulting stability and controllability of the discrete time model, when used by the nonlinear model predictive controller 110. The results of this analysis can be incorporated in automatically generated executable program code for a parameter checker 113 (see FIG. 1) that checks parameters input to nonlinear model predictive controller 110 for stability and controllability in real time during online control of a controlled system 150, as discussed above.

Figure 4C:
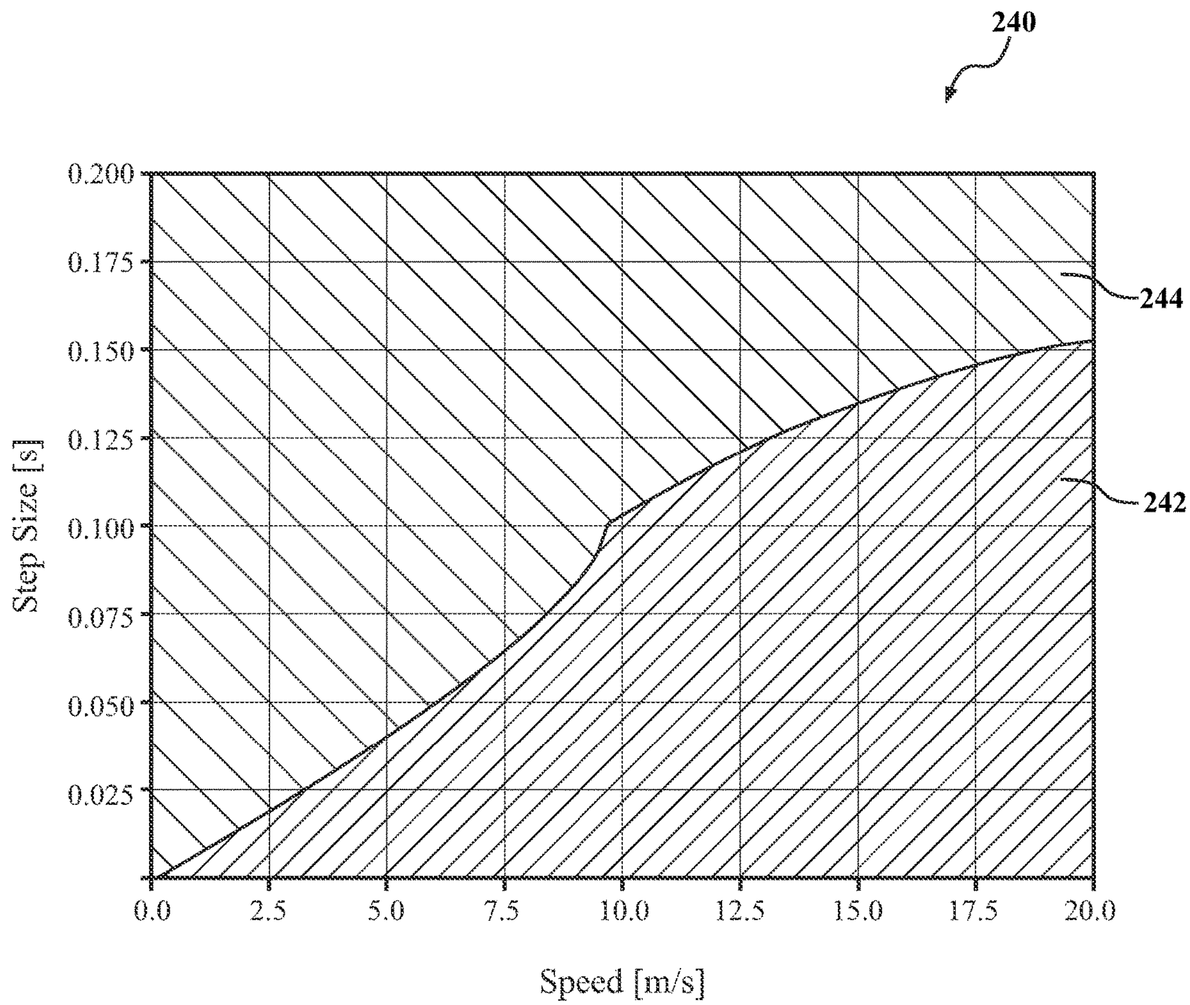
FIG. 4C illustrates a parameter-space plot in which a region has been identified in which a discrete time model of a nonlinear dynamical system is both stable and controllable when used by a nonlinear model predictive controller according to one or more embodiments described and illustrated herein.

As shown in FIG. 4A, the sample optimal control problem code 200 includes a parameter-checking sub-component 203. During the offline phase, the code element 206 calls the parameter-checking functionality to perform the analysis across the parameter space discussed above (identifying the one or more stable and controllable regions of the parameter space). The lines of code immediately following code element 206 are one example of what an implementation of that analysis might look like in the syntax of the programming language. Once the system (100 or 400) has identified, during the offline phase, the one or more regions in the parameter space in which the discrete time model is both stable and controllable, a code element such as code element 208 can be called to invoke the generated executable program code (e.g., parameter checker 113 in FIG. 1) that checks the validity of a particular parameter value or combination of parameter values input to nonlinear model predictive controller 110 during the online phase. To do so, code element 208 can access a lookup table that is explained in further detail below in connection with FIG. 4C. As explained above, in the online phase, system 100 controls, in real time, a nonlinear dynamical system 150 such as an autonomous vehicle or other robot.

FIG. 4C illustrates a parameter-space plot 240 in which a region has been identified in which a discrete time model of a nonlinear dynamical system 150 is both stable and controllable when used by a nonlinear model predictive controller 110 according to one or more embodiments described and illustrated herein. In the example of FIG. 4C, Euler discretization has been used to create the discrete time counterpart of continuous time model 112. In FIG. 4C, the system (100 or 400) has identified stable and controllable region 242 (blue) and unstable or uncontrollable region 244 (red) for various combinations of two discrete-time-model parameters: (1) the discrete-time sampling interval (step size), in seconds, and (2) vehicle speed, in meters per second. As those skilled in the art will recognize, the information in parameter-space plot 240 can be represented as a lookup table that supports a rapid determination, by parameter checker 113 in an online phase, of whether a particular combination of values of the two parameters input to nonlinear model predictive controller 110 results in a stable and controllable discrete time model or not. In one embodiment, a pair of values of the respective parameters act as or are converted to indices to the lookup table, the contents of which can be encoded (e.g., with binary "1" or "0") to represent, respectively, "stable and controllable" (corresponding to stable and controllable region 242) or "unstable or uncontrollable" (corresponding to unstable or uncontrollable region 244). In one embodiment, the code element 208 mentioned above consults the lookup table just described during an online phase, as discussed above.

The sample optimal control problem code 200 further includes a cost function sub-component 204 that describes the cost function of Equation (2) above. The cost function sub-component 204 enables the user to construct the cost function of an optimal control problem. As shown in FIG. 4A, the cost function sub-component 204 follows the mathematical expression of the optimal control problem. The programming language allows the user to establish the time-varying parameters of the cost function, which in this case are the velocity and the acceleration. Further, the programming language allows the user to easily construct the cost function using easy to understand syntax.

Additionally, as shown in FIG. 4B, the sample optimal control problem code 200 includes a constraints sub-component 205 that enables a user to establish the constraints of the optimal control problem (e.g., Equations (3a)-(3c) above). Particularly, the constraints sub-component 205 allows the user to establish the time-varying parameters, and also allows the user to set the limits on the various constraints. In the example of FIG. 4B, the time-varying parameters are established as v_min and v_max, and the limits of the constraints for velocity v (velocity limit), acceleration a and jerk J are established as defined by Equations (2a)-(2c) above.

Referring once again to FIG. 3, at block 183 a solver code generator extracts the optimal control problem from the optical control problem code. For example, all parameters, variables, the cost function, the dynamics, the constrains, the linearization point, and the discretization method are extracted. This extracted information is then used to define the data required by the canonical mathematical program, e.g., the matrices H, h, A, B, F, G, c in equation (5), which are encoded by the code generator for the user. In addition, several traits of the program are determined, such as the sparsity pattern (e.g., diagonal matrices or time invariance). The solver code may be customized to efficiently compute the program based on one or more sparsity patterns. As a non-limiting example, common sub-expression elimination may also be used to customize solver code for efficient computation. As another non-limiting example, the solver code generator may extract the optimal control problem defined by Equations (1)-(3c) above from the optimal control problem code 200 illustrated in FIGS. 4A-4C.

At block 184, the solver code generator is programmed to generate an optimization problem from the optimal control problem that is extracted from the optimal control problem code by an encoding process that uses the selected linearization point and discretization method. As a non-limiting example, the solver code generator may generate the optimization problem of Equation (5) that corresponds to the optimal control problem of Equations (1)-(3c) above.

After generating the optimization problem, it is used to automatically generate solver code at block 185. The information for the optimization problem that was extracted from the user-inputted optimal control program code is populated into a solver template that is used to generate the solver code. A non-limiting example solver template 220 is illustrated by FIG. 5. The example solver template 220 has a solver customization sub-component 222 that enables customizations such as whether the cost matrices exhibit a diagonal sparsity pattern, whether the dynamics are time invariant, and whether the solver should use dynamic memory allocation. A solver input sub-component 224 of the solver template 220 automatically generates the solver inputs from the optimization problem. As shown in FIG. 5, the solver input sub-component 224 includes matrix generation functions that calculate the matrices using the parameters of the optimization problem. The matrices are calculated by examining the equations describing the cost, constraints, and dynamics, and rearranging these into matrices of the canonical mathematical program. An example automatically generated matrix code 230 using the solver code generator is depicted by FIG. 6. It should be understood that embodiments free the software engineering from needing to manually write code such as the code of FIG. 6 representing a matrices.

The code generation at block 185 can also include generation of executable program code for an online parameter checker 113, as discussed above. This parameter-checking program code (e.g., code element 208 and other supporting executable code) can consult a lookup table such as that discussed above in connection with FIG. 4C to determine whether the value of a parameter or the values of a combination of parameters of the discrete time model input to nonlinear model predictive controller 110 lie within a region of the parameter space in which the discrete time model is both stable and controllable.

With the solver code automatically generated at block 185, it is then imported into a controlled system 150 (e.g., an autonomous vehicle) for execution at block 186. It should be noted that the code generated to implement an online parameter checker 113 enables the nonlinear model predictive controller 110 to be configured with values of the one or more parameters of the discrete time model that lie within the one or more regions of stability and controllability in the parameter space. This is accomplished by parameter checker 113 ensuring, in real time, that parameters input to nonlinear model predictive controller 110 lie within a stable and controllable region of the parameter space, as discussed above. If a situation arises during online control of a controlled system 150 in which the value of a parameter or the values of a combination of parameters do not satisfy stability and controllability, system 100 can automatically execute a predetermined fallback strategy to avoid use of the invalid parameter(s).

Figure 7:
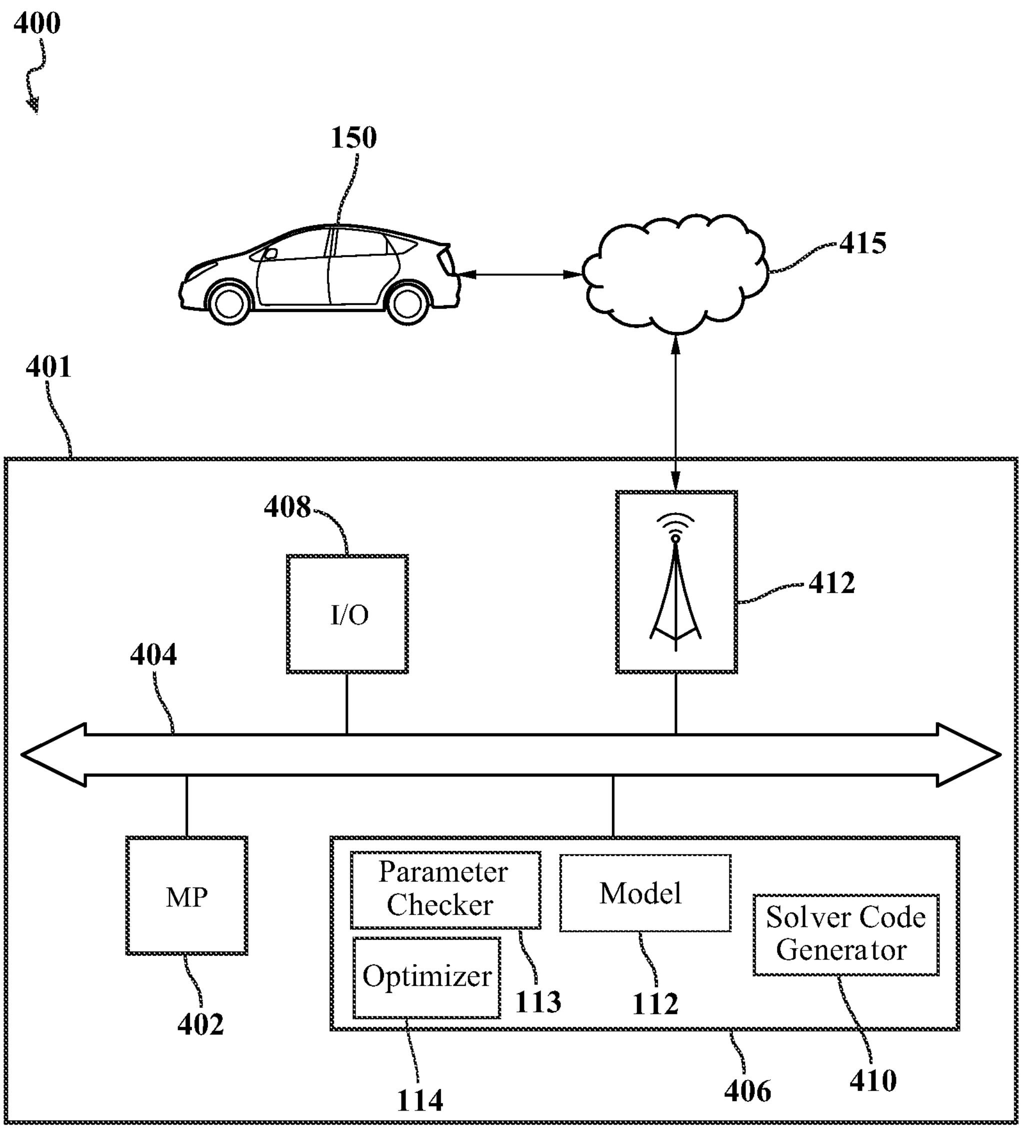
FIG. 7 schematically illustrates an example system for automatically generating solver code and deploying the solver code to a controlled system according to one or more embodiments described and illustrated herein.

FIG. 7 depicts an example system 400 for performing the functionalities as described herein. In some embodiments, the system 400 may include a computing device 401, such as a general purpose computer, and a controlled system, such as the vehicle 150 illustrated in FIG. 7. The example computing device 401 of the system 400 includes one or more processors 402 ("MP" stands for "microprocessor," in FIG. 7), a communication path 404, one or more memory modules 406, input/output devices 408, and network interface hardware 412, the details of which will be set forth in the following paragraphs. It should be understood that the system 400 of FIG. 7 is provided for illustrative purposes only, and that other systems 400 comprising more, fewer, or different components may be utilized.

Each of the one or more processors 402 may be any device capable of executing computer readable and executable instructions. Accordingly, each of the one or more processors 402 may be a controller, an integrated circuit, a microchip, a computer, or any other computing device. The one or more processors 402 are coupled to a communication path 404 that provides signal interconnectivity among various modules of the system 400. Accordingly, the communication path 404 may communicatively couple any number of processors 402 with one another and allow the modules coupled to the communication path 404 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 404 may be formed from any medium that is capable of transmitting a signal, such as, for example, conductive wires, conductive traces, optical waveguides, or the like. In some embodiments, the communication path 404 may facilitate the transmission of wireless signals, such as WiFi, Bluetooth®, Near Field Communication (NFC) and the like. Moreover, the communication path 404 may be formed from a combination of media capable of transmitting signals. In one embodiment, the communication path 404 comprises a combination of conductive traces, conductive wires, connectors, and buses that cooperate to permit the transmission of electrical data signals to components such as processors, memories, sensors, input devices, output devices, and communication devices. Accordingly, the communication path 404 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like that are capable of traveling through a medium.

The system 400 includes one or more memory modules 406 coupled to the communication path 404. The one or more memory modules 406 may comprise RAM, ROM, flash memories, hard drives, or any other device capable of storing computer readable and executable instructions such that the computer readable and executable instructions can be accessed and executed by the one or more processors 402. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored in the one or more memory modules 406. Alternatively, the computer readable and executable instructions may be written in a hardware description language (HDL), such as logic implemented via either a field-programmable gate array (FPGA) configuration or an application-specific integrated circuit (ASIC) or their equivalents. Accordingly, the methods described herein may be implemented in any conventional computer programming language, as pre-programmed hardware elements, or as a combination of hardware and software and/or firmware components.

The one or more memory modules 406 include logic in the form of machine-readable instructions that, when executed by the one or more processors 402, perform the various functions described herein, such as optimizer logic 114 and solver code generator logic 410. The one or more memory modules 406 may further store the model 112 of the controlled system 150 and the parameter checker 113 and/or program code that performs the stability and controllability analysis to support generation of executable program code for a parameter checker 113, as described above. The memory modules 406 may also store the discrete time model (not shown in FIG. 7) of the controlled system 150 derived, through discretization, from the continuous time model 112. Additional data used to support these functionalities may be stored in the one or more memory modules 406 and/or in remote memory modules.

Still referring to FIG. 7, the system 400 may include network interface hardware 412 for communicatively coupling the system 400 to a remote computing device (not shown). The network interface hardware 412 can be communicatively coupled to the communication path 404 and can be any device capable of transmitting and/or receiving data via a network 415. Accordingly, the network interface hardware 412 can include a communication transceiver for sending and/or receiving any wired or wireless communication. For example, the network interface hardware 412 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 412 includes hardware configured to operate in accordance with the Bluetooth® wireless communication protocol. In some embodiments, the network interface hardware 412 and the network 415 may be utilized to deploy updated solver code to vehicles 150 by way of an over-the-air update process. For example, in one embodiment, system 400 can download updated solver code to a nonlinear control system 100 (refer to FIG. 1) that is deployed within a controlled system 150 such as an autonomous vehicle or other robot.

Figure 8:
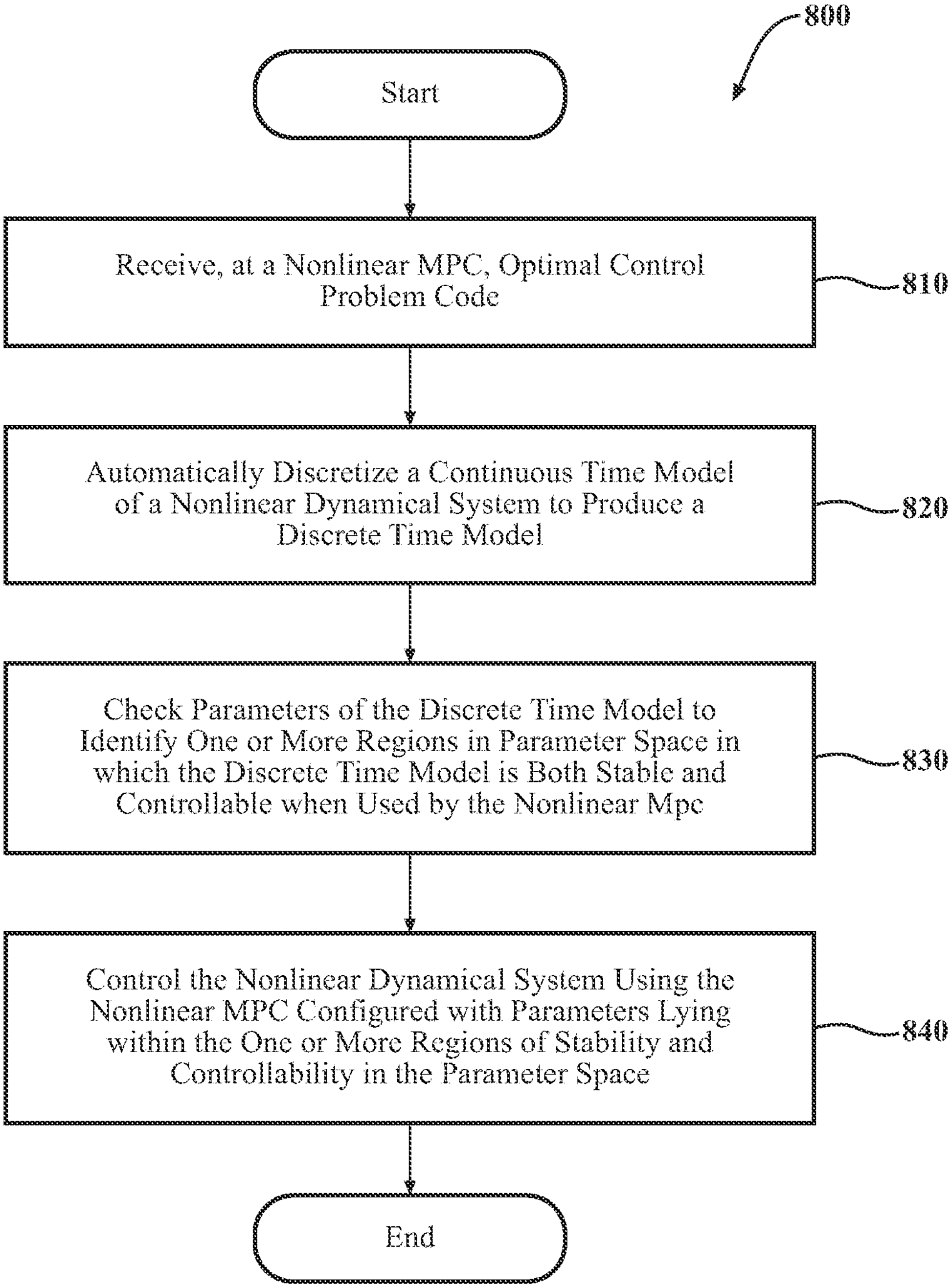
FIG. 8 illustrates an example method for automatically ensuring the stability and controllability of a nonlinear control system according to one or more embodiments described and illustrated herein.

FIG. 8 illustrates an example method 800 for automatically ensuring the stability and controllability of a nonlinear control system according to one or more embodiments described and illustrated herein. Method 800 will be discussed from the perspective of system 100 in FIG. 1 with reference, also, to system 400 in FIG. 7. While method 800 is discussed in combination with system 100, it should be appreciated that method 800 is not limited to being implemented within system 100, but system 100 is instead one example of a nonlinear control system that may implement method 800.

At block 810, nonlinear model predictive controller 110 of system 100 receives optimal control problem code representing an optimal control problem that includes a cost function, one or more constraints, and a continuous time model 112 representing a nonlinear dynamical system 150. Examples of optimal control problem code 200 are provided in FIGS. 4A and 4B.

At block 820, system 100 automatically discretizes the continuous time model 112 to produce a discrete time model of the nonlinear dynamical system 150, the discrete time model including one or more parameters. The discretization process is discussed above in greater detail. As also discussed above, in some embodiments, system 100 also automatically linearizes the continuous time model 112 in accordance with a specified linearization point. That is, the discrete time model is approximated as being linear within a predetermined neighborhood of the specified linearization point.

At block 830, a system (e.g., system 100 or system 400) automatically checks the one or more parameters (e.g., by sweeping at least one of the one or more parameters through a predetermined operational range) to identify one or more regions (242) in a parameter space in which the discrete time model is both stable and controllable, when used by the nonlinear model predictive controller 110. An example of a parameter-checking sub-component 203 that supports this analysis is shown in FIG. 4A. In some embodiments, this analysis of the parameter space is performed by the system during an offline phase. The resulting information regarding stable and controllable regions 242 and unstable or uncontrollable regions 244 (refer to FIG. 4C) can be represented in one or more lookup tables that are used by an in-vehicle instantiation of system 100 in conjunction with executable parameter-checking code, parameter checker 113, during an online phase in which system 100 controls a nonlinear dynamical system 150. Such executable parameter-checking code can be generated, e.g., by solver code generator 410 in system 400 of FIG. 7.

At block 840, system 100 controls, at least in part, operation of the nonlinear dynamical system 150 using the nonlinear model predictive controller 110. The nonlinear model predictive controller 150 is configured with values of the one or more parameters of the discrete time model that lie within the one or more stable and controllable regions of the parameter space. As explained above, this is accomplished by parameter checker 113 of system 100 ensuring, in real time, that parameters input to nonlinear model predictive controller 110 lie within a stable and controllable region of the parameter space. As also explained above, if a situation arises during online control of a controlled system 150 in which the value of a parameter or the values of a combination of parameters do not satisfy the stability and controllability conditions, system 100 can automatically execute a predetermined fallback strategy to avoid use of the invalid parameter(s).

In the case of an autonomous vehicle, controlling the operation of the vehicle includes, e.g., controlling acceleration, deceleration/braking, steering, and other vehicle functions that enable the autonomous vehicle to travel along a specified route on one or more roadways.

It should now be understood that embodiments of the present disclosure are directed to systems and methods for automatically generating solver code for a nonlinear model predictive control solver. Embodiments provide an easy-to-use programming language that enables a user to write simple code (optimal control problem code) that represents an optimal control problem that reflects the mathematical expression of the optimal control problem. Embodiments also enable a user to customize the linearization point and the chosen discretization method to linearize the nonlinear optimal control problem. This powerful feature lets a user quickly change the linearization point and discretization method without needing to update many lines of complicated solver code. Further, embodiments automatically encode the optimal control problem represented by the optimal control problem code into a canonically expressed optimization problem. From the optimization problem, a solver code template is populated to automatically generate solver code that may be executed by a nonlinear model predictive control solver and ultimately used to control a controlled system. Accordingly, software engineers are saved from writing complicated solver code comprising thousands of lines.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-8, but the implementations are not limited to the illustrated structure or application.

The terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A nonlinear control system, the nonlinear control system comprising:

a processor; and a memory storing machine-readable instructions that, when executed by the processor, cause the processor to:

receive, at a nonlinear model predictive controller, optimal control problem code representing an optimal control problem that includes a cost function, one or more constraints, and a continuous time model representing a nonlinear dynamical system;

discretize automatically the continuous time model to produce a discrete time model of the nonlinear dynamical system, wherein the discrete time model includes one or more parameters;

check automatically, during an offline phase, the one or more parameters by sweeping at least one of the one or more parameters through a predetermined operational range to identify one or more regions in a parameter space in which the discrete time model is both stable and controllable when used by the nonlinear model predictive controller, wherein stability is determined based on eigenvalues of the discrete time model and controllability is determined based on a Controllability Gramian of the discrete time model; and control, at least in part, operation of the nonlinear dynamical system in an online phase using the nonlinear model predictive controller, wherein the nonlinear model predictive controller is configured with values of the one or more parameters that lie within the one or more regions of the parameter space.

2. The nonlinear control system of claim 1, wherein the nonlinear dynamical system is a robot.

3. The nonlinear control system of claim 2, wherein the robot is an autonomous vehicle.

4. The nonlinear control system of claim 2, wherein the robot is one of a service robot, a delivery robot, a companionship robot, or an unmanned aerial vehicle.

5. The nonlinear control system of claim 1, wherein the one or more parameters include a discrete-time sampling interval and a speed of movement of the nonlinear dynamical system.

6. The nonlinear control system of claim 1, wherein the machine-readable instructions include further instructions that, when executed by the processor, cause the processor to generate executable program code for a parameter checker that checks automatically the one or more parameters.

7. The nonlinear control system of claim 1, wherein the machine-readable instructions include further instructions that, when executed by the processor, cause the processor to linearize the continuous time model in accordance with a specified linearization point.

8. A non-transitory computer-readable medium for automatically ensuring stability and controllability of a nonlinear control system and storing instructions that, when executed by a processor, cause the processor to:

receive, at a nonlinear model predictive controller, optimal control problem code representing an optimal control problem that includes a cost function, one or more constraints, and a continuous time model representing a nonlinear dynamical system;

discretize automatically the continuous time model to produce a discrete time model of the nonlinear dynamical system, wherein the discrete time model includes one or more parameters;

check automatically, during an offline phase, the one or more parameters by sweeping at least one of the one or more parameters through a predetermined operational range to identify one or more regions in a parameter space in which the discrete time model is both stable and controllable when used by the nonlinear model predictive controller, wherein stability is determined based on eigenvalues of the discrete time model and controllability is determined based on a Controllability Gramian of the discrete time model; and control, at least in part, operation of the nonlinear dynamical system in an online phase using the nonlinear model predictive controller, wherein the nonlinear model predictive controller is configured with values of the one or more parameters that lie within the one or more regions of the parameter space.

9. The non-transitory computer-readable medium of claim 8, wherein the nonlinear dynamical system is a robot.

10. The non-transitory computer-readable medium of claim 9, wherein the robot is an autonomous vehicle.

11. The non-transitory computer-readable medium of claim 9, wherein the robot is one of a service robot, a delivery robot, a companionship robot, or an unmanned aerial vehicle.

12. The non-transitory computer-readable medium of claim 8, wherein the one or more parameters include a discrete-time sampling interval and a speed of movement of the nonlinear dynamical system.

13. The non-transitory computer-readable medium of claim 8, wherein the instructions include further instructions that, when executed by the processor, cause the processor to generate executable program code for a parameter checker that checks automatically the one or more parameters.

14. A method, comprising:

receiving, at a nonlinear model predictive controller, optimal control problem code representing an optimal control problem that includes a cost function, one or more constraints, and a continuous time model representing a nonlinear dynamical system;

discretizing automatically the continuous time model to produce a discrete time model of the nonlinear dynamical system, wherein the discrete time model includes one or more parameters;

checking automatically, during an offline phase, the one or more parameters by sweeping at least one of the one or more parameters through a predetermined operational range to identify one or more regions in a parameter space in which the discrete time model is both stable and controllable when used by the nonlinear model predictive controller, wherein stability is determined based on eigenvalues of the discrete time model and controllability is determined based on a Controllability Gramian of the discrete time model; and controlling, at least in part, operation of the nonlinear dynamical system in an online phase using the nonlinear model predictive controller, wherein the nonlinear model predictive controller is configured with values of the one or more parameters that lie within the one or more regions of the parameter space.

15. The method of claim 14, wherein the nonlinear dynamical system is a robot.

16. The method of claim 15, wherein the robot is an autonomous vehicle.

17. The method of claim 15, wherein the robot is one of a service robot, a delivery robot, a companionship robot, or an unmanned aerial vehicle.

18. The method of claim 14, wherein the one or more parameters include a discrete-time sampling interval and a speed of movement of the nonlinear dynamical system.

19. The method of claim 14, further comprising generating executable program code for a parameter checker that performs the checking.

20. The method of claim 14, further comprising linearizing the continuous time model in accordance with a specified linearization point.

* * * * *